United States Patent
Chen (10) Patent No.: US 10,097,094 B2
(45) Date of Patent: Oct. 9, 2018

(54) CONTROL CIRCUIT AND METHOD FOR PROGRAMMING AN OUTPUT VOLTAGE OF A POWER CONVERTER

(71) Applicant: RICHTEK TECHNOLOGY CORPORATION, Zhubei, Hsinchu County (TW)

(72) Inventor: Isaac Y. Chen, Jubei (TW)

(73) Assignee: RICHTEK TECHNOLOGY CORPORATION, Zhubei, Hsinchu County (TW)

( * ) Notice: Subject to any disclaimer, the term of this patent is extended or adjusted under 35 U.S.C. 154(b) by 370 days.

(21) Appl. No.: 14/920,078

(22) Filed: Oct. 22, 2015

(65) Prior Publication Data

US 2016/0218625 A1    Jul. 28, 2016

(30) Foreign Application Priority Data

Jan. 22, 2015 (TW) .............................. 104102151 A (51) Int. Cl.
*H02M 3/335* (2006.01)
*H02M 1/00* (2006.01)

(52) U.S. Cl.
CPC ... *H02M 3/33523* (2013.01); *H02M 3/33515* (2013.01); *H02M 2001/0025* (2013.01)

(58) Field of Classification Search
CPC ..... H02M 2001/0025; H02M 3/33515; H02M 3/33523
See application file for complete search history.

(56) References Cited

U.S. PATENT DOCUMENTS

| 5,773,963 | A | 6/1998 | Blanc et al. |
| 7,145,317 | B1 | 12/2006 | Shah |
| 7,242,339 | B1 | 7/2007 | Truong et al. |
| 9,143,033 | B2 | 9/2015 | Tai et al. |
| 2009/0200997 | A1 | 8/2009 | Yang et al. |
| 2013/0099761 | A1* | 4/2013 | Dong .................... H02M 3/156 323/271 |

* cited by examiner

*Primary Examiner* — Adolf Berhane
*Assistant Examiner* — Afework Demisse
(74) *Attorney, Agent, or Firm* — Muncy, Geissler, Olds & Lowe, P.C.

(57) ABSTRACT

A power converter determines a feedback signal according to a voltage signal related to an output voltage of the power converter and a reference voltage, thereby regulating the output voltage. A control circuit and method for programming the output voltage of the power converter utilize an offset current generator to inject a current or sink a current for changing the voltage signal or the reference signal, thereby adjusting the output voltage. As a result, it gets rid of complicated circuitry but provides more steps adjustment, which reduces related costs.

15 Claims, 9 Drawing Sheets

CONTROL CIRCUIT AND METHOD FOR PROGRAMMING AN OUTPUT VOLTAGE OF A POWER CONVERTER

FIELD OF THE INVENTION

The present invention is related generally to programmable power converters. More particularly, the present invention is related to a control circuit and method for programming an output voltage of a power converter.

BACKGROUND OF THE INVENTION

Figure 1:
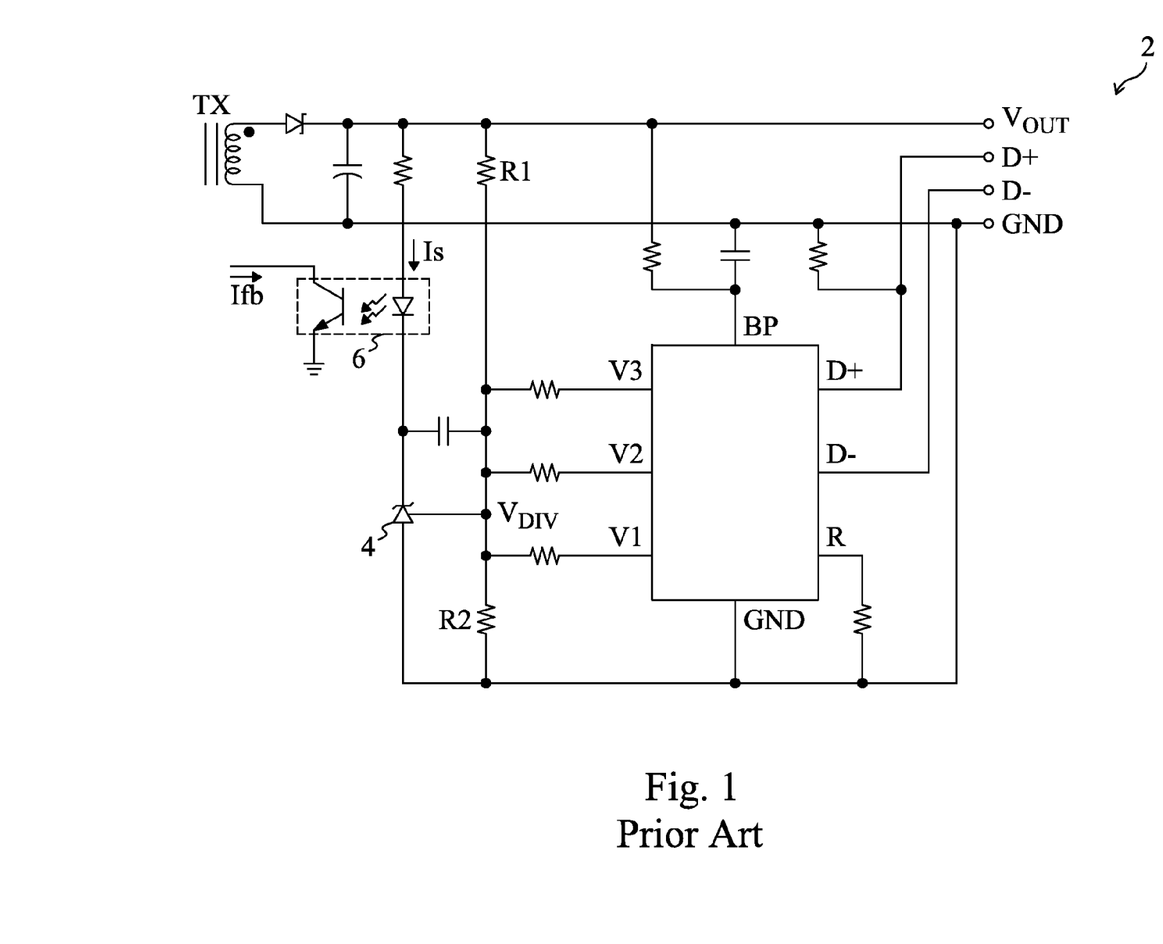
FIG. 1 shows a conventional power converter.

One of the charging methods for the portable electronic devices, for example the smart phones and the tablet personal computers, is to utilize a power converter to convert the power into the output voltage. The output voltage is provided to the electronic devices for charging through the transmission line connected to the power converter. FIG. 1 shows a conventional power converter 2, which includes a transformer TX generated an output voltage $V_{OUT}$ at a secondary side of the transformer TX. Resistors R1 and R2 form a voltage divider which is coupled to an output terminal of the power converter 2 to detect the output voltage $V_{OUT}$ and to divide the output voltage $V_{OUT}$ to generate a voltage signal $V_{DIV}$. A shunt regulator 4 is coupled to the resistors R1 and R2 as well as an optical coupler 6. The shunt regulator 4 will compare the voltage signal $V_{DIV}$ with a reference voltage to determine the current Is flowing through the optical coupler 6. Accordingly, the optical coupler 6 generates a feedback signal Ifb related to the current Is for a control integrated circuit (not shown in FIG. 1) to regulate the output voltage $V_{OUT}$. There are more and more systems that need to change the output voltage $V_{OUT}$ according to different needs, for example the rapid charging mode or the sleep mode, in order to improve their performance. There are two existing methods for changing the feedback signal Ifb in order to change the output voltage $V_{OUT}$: changing a divider ratio of the voltage divider to adjust the voltage signal $V_{DIV}$, or choosing a different reference voltage.

Figure 2:
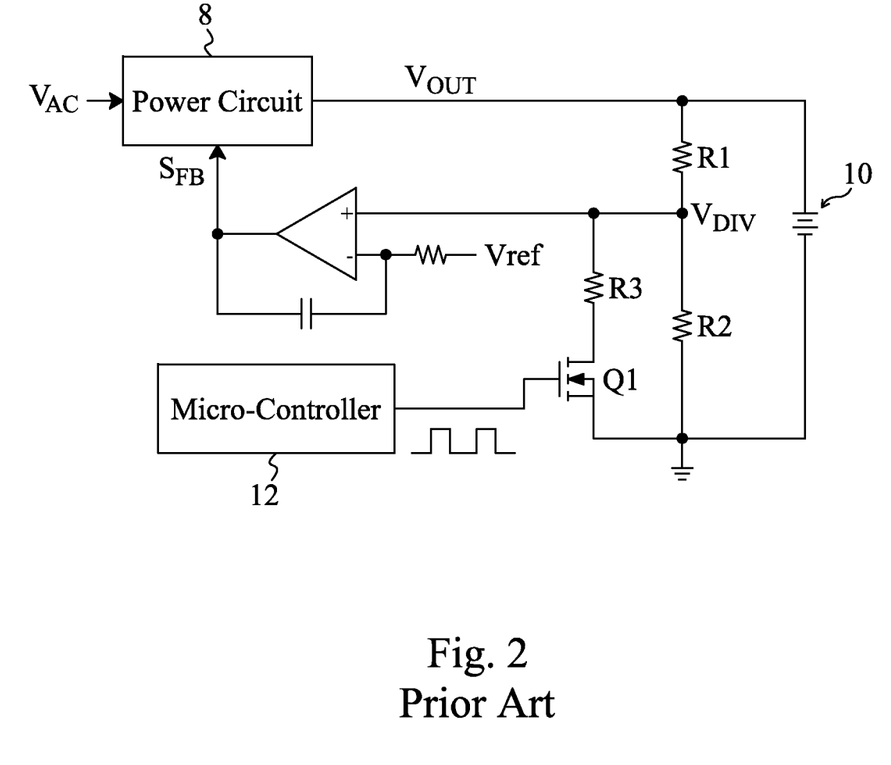
FIG. 2 shows a conventional method for changing a divider ratio of a voltage divider.

As disclosed by U.S. Pat. No. 5,773,963, one of the methods for changing a divider ratio to adjust the output voltage of a power converter is illustrated in FIG. 2, in which a power circuit 8 converts a power input $V_{AC}$ into an output voltage $V_{OUT}$ for charging a battery 10. The output voltage $V_{OUT}$ is divided by a divider ratio to generate a voltage signal $V_{DIV}$ that is compared with a reference voltage Vref to generate a feedback signal $S_{FB}$ for the power circuit 8 to adjust the output voltage $V_{OUT}$. A microcontroller 12 controls the switching of a transistor Q1 so as to determine whether a resistor R3 and the resistor R2 should be in a parallel connection. Accordingly, the divider ratio will be controlled and thereby adjust the output voltage $V_{OUT}$.

Figure 3:
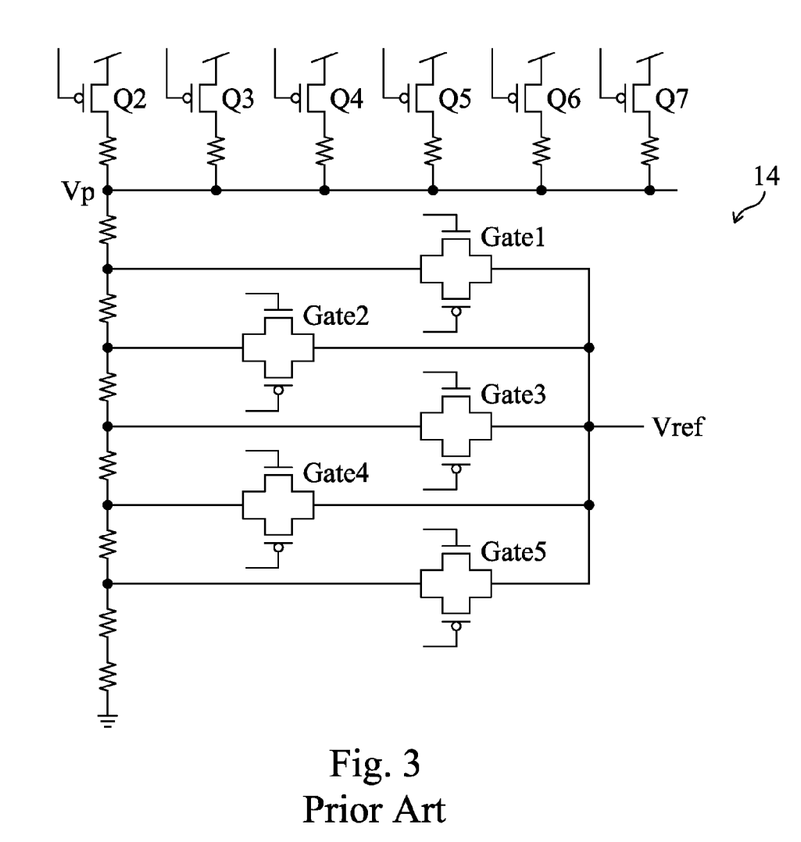
FIG. 3 shows a conventional method for choosing a reference voltage.

On the other hand, U.S. Pat. No. 7,242,339 discloses a method for choosing a reference voltage to adjust the output voltage of a power converter, as shown in FIG. 3, in which a resistor switch circuit 14 is utilized to choose a needed reference Vref in a way that switches Q2 to Q7 in the resistor switch circuit 14 are selectively turned on to set either one of different voltages as the voltage Vp to be divided by several serially-connected resistors, and channel gates Gate 1 to Gate 5 are controlled to choose one of the divided voltage as the reference voltage Vref.

The existing methods for changing the output voltage mainly utilize the switch and the resistor to change the output voltage $V_{OUT}$. If the adjustable steps of the output voltage $V_{OUT}$ are to be raised, the numbers of the resistor and the switch have to be increased. Adversely, related costs are also increased. Moreover, these switches and resistors can be merely installed out of the integrated circuit (IC), which results in a complicate circuitry.

SUMMARY OF THE INVENTION

An objective of the present invention is to provide a control circuit and method for programming an output voltage of a power converter.

According to the present invention, a control circuit for programming an output voltage of a power converter, which includes a feedback loop configured to operably provide a feedback signal related to the output voltage for regulating the output voltage, comprises a voltage divider and an offset current generator. The voltage divider divides the output voltage to generate a voltage signal for controlling the feedback signal. The offset current generator is coupled to the voltage divider for injecting a first current to the voltage divider or sinking a second current from the voltage divider, thereby adjusting the voltage signal and the output voltage.

According to the present invention, a control circuit for programming an output voltage of a power converter, which includes a feedback loop configured to operably provide a feedback signal related to the output voltage for regulating the output voltage, comprises a voltage divider, an offset resistor, and an offset current generator. The voltage divider divides the output voltage to generate a first voltage signal. The offset resistor has a first terminal coupled to the voltage divider to receive the first voltage signal, and a second terminal to provide a second voltage signal for controlling the feedback signal. The offset current generator is coupled to the second terminal of the offset resistor for injecting a first current to the offset resistor or sinking a second current from the offset resistor, thereby offsetting the first voltage signal to generate the second voltage signal. The offset current generator adjusts the first current or the second current to adjust the second voltage so that the feedback signal will be changed so as to adjust the output voltage.

According to the present invention, a control circuit for programming an output voltage of a power converter, which includes a feedback loop configured to operably provide a feedback signal related to the output voltage for regulating the output voltage at a target level, comprises a first digital to analog converter, an offset resistor, and an offset current generator. The first digital to analog converter provides a first reference voltage. The offset resistor has a first terminal coupled to the first digital to analog converter to receive the first reference voltage, and a second terminal to provide a second reference voltage for determining the target level. The offset current generator is coupled to the second terminal of the offset resistor for injecting a first current to the offset resistor or sinking a second current from the offset resistor, thereby offsetting the first reference voltage to generate the second reference voltage. The offset current generator adjusts the first current or the second current to adjust the second reference voltage, thereby adjusting the target level.

According to the present invention, a control circuit for programming an output voltage of a power converter, which includes a transformer, an auxiliary coil in a primary side of the transformer and configured to operably detect the output voltage to generate a first voltage signal, and a voltage divider coupled to the auxiliary coil to divide the first voltage signal to generate a second voltage signal, comprises an offset resistor and an offset current generator. The offset resistor has a first terminal coupled to the voltage divider to receive the second voltage signal, and a second terminal to provide a third voltage signal. The offset current generator is coupled to the second terminal of the offset resistor for injecting a first current to the offset resistor or sinking a second current from the offset resistor, thereby offsetting the second voltage signal to generate the third voltage signal so as to regulate the output voltage. The offset current generator adjusts the first current or the second current to adjust the third voltage signal, thereby adjusting the output voltage.

According to the present invention, a control method for programming an output voltage of a power converter, which includes a feedback loop configured to operably provide a feedback signal related to the output voltage so as to regulate the output voltage, comprises the steps of: dividing the output voltage by a voltage divider to generate a voltage signal so as to control the feedback signal, and injecting a first current to the voltage divider or sinking a second current from the voltage divider so as to change the voltage signal to adjust the output voltage.

According to the present invention, a control method for programming an output voltage of a power converter, which includes a feedback loop configured to operably provide a feedback signal related to the output voltage so as to regulate the output voltage, comprises the steps of: dividing the output voltage to generate a first voltage signal applied to a first terminal of an offset resistor, injecting a first current to a second terminal of the offset resistor or sinking a second current from the second terminal of the offset resistor, thereby offsetting the first voltage signal to generate a second voltage signal so as to control the feedback signal, and adjusting the first current or the second current so as to adjust the second voltage signal, thereby changing the feedback signal to adjust the output voltage.

According to the present invention, a control method for programming an output voltage of a power converter, which includes a feedback loop configured to operably provide a feedback signal related to the output voltage so as to regulate the output voltage at a target level, comprises the steps of: providing a first reference voltage to a first terminal of an offset resistor, injecting a first current to a second terminal of the offset resistor or sinking a second current from the second terminal of the offset resistor, thereby offsetting the first reference voltage to generate a second reference voltage so as to determine the target level, and adjusting the first current or the second current so as to adjust the second reference voltage, thereby adjusting the target level.

According to the present invention, a control method for programming an output voltage of a power converter, which includes a transformer, and an auxiliary coil in a primary side of the transformer and configured to operably detect the output voltage to generate a first voltage signal, comprises the steps of: dividing the first voltage signal to generate a second voltage signal applied to a first terminal of an offset resistor, injecting a first current to a second terminal of the offset resistor or sinking a second current from the second terminal of the offset resistor, thereby offsetting the second voltage signal to generate a third reference voltage so as to regulate the output voltage, and adjusting the first current or the second current so as to regulate the third voltage signal to adjust the output voltage.

In contrast with the conventional methods for changing the divider ratio and choosing the reference voltage, control circuits and methods according to the present invention, which adjust the output voltage of a power converter via controlling the first and the second currents, are simpler. Particularly, the present invention needs no extra switches or resistors to increase the adjustable steps.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 4:
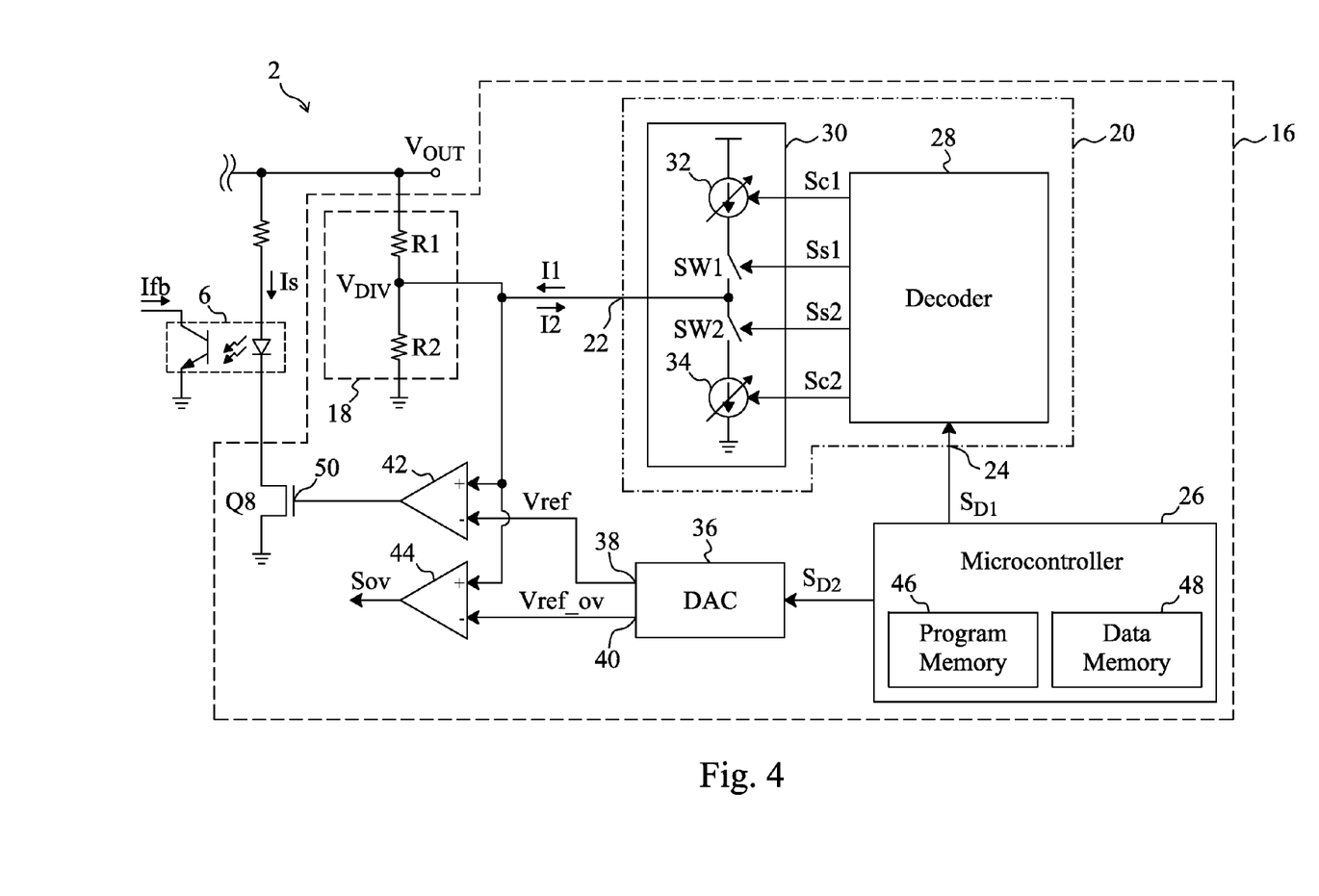
FIG. 4 shows a first embodiment of the present invention.
Figure 5:
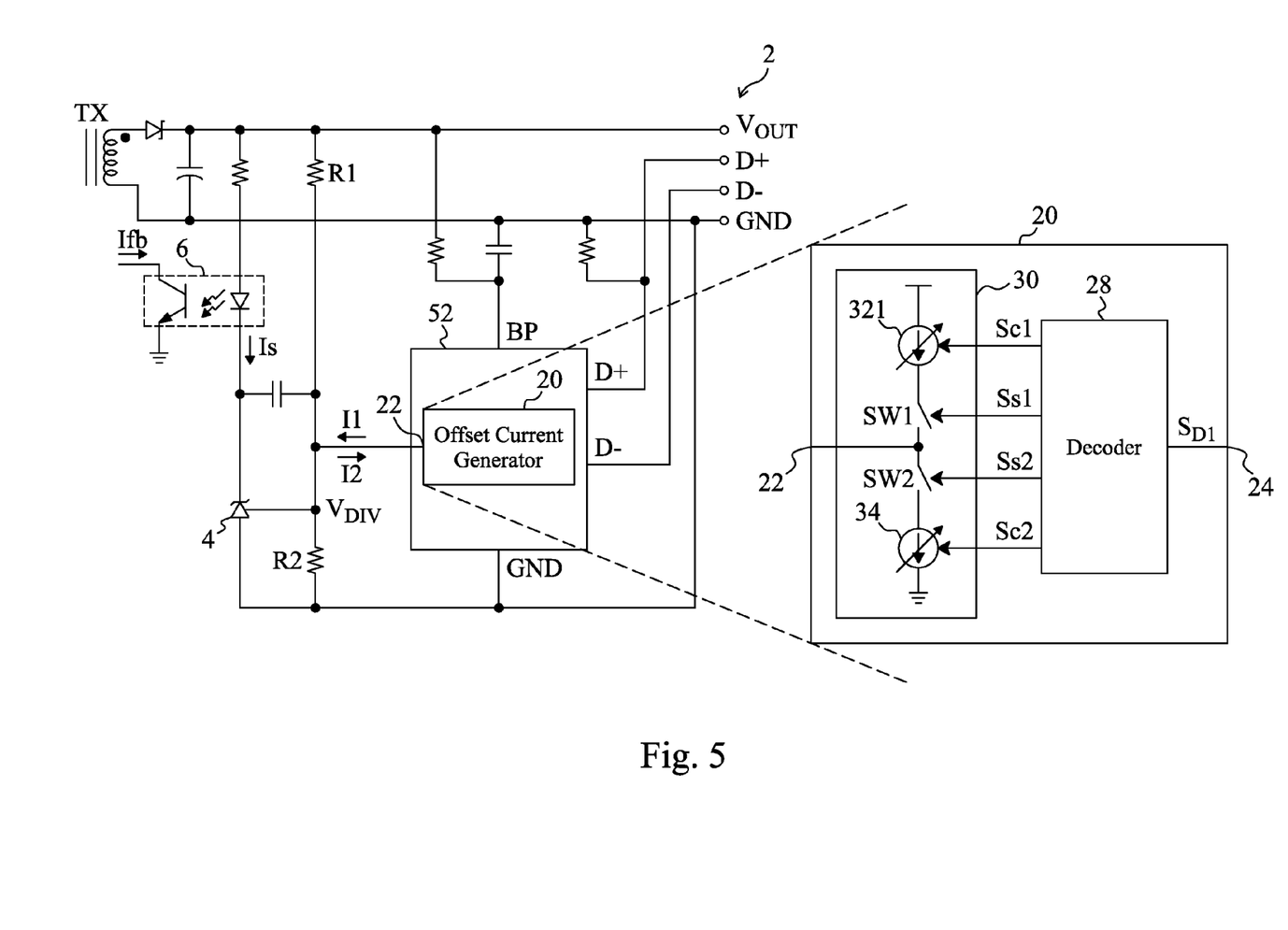
FIG. 5 is a simplified circuitry of FIG. 4.

FIG. 4 shows a first embodiment of the present invention, and FIG. 5 shows a simplified circuitry of FIG. 4. Referring to FIGS. 4 and 5, at a secondary side of a transformer TX of a power converter 2, an optical coupler 6 is served as a feedback loop for providing a feedback signal Ifb related to the output voltage $V_{OUT}$ to regulate the output voltage $V_{OUT}$. A control circuit 16 is coupled to the optical coupler 6 for controlling the feedback signal Ifb so as to regulate the output voltage $V_{OUT}$. Alternatively, the optical coupler 6 can be replaced by other feedback loop.

The control circuit 16 includes a voltage divider 18 that is formed by the series resistors R1 and R2 for dividing the output voltage $V_{OUT}$ to generate a voltage signal $V_{DIV}$ for controlling the feedback signal Ifb. An offset current generator 20 has a terminal 22 coupled to the voltage divider 18 and a terminal 24 coupled to a microcontroller 26. The offset current generator 20 injects a current I1 to the voltage divider 18 or sinks a current I2 from the voltage divider 18, thereby adjusting the voltage signal $V_{DIV}$ so as to adjust the output voltage $V_{OUT}$. In the offset current generator 20, a decoder 28 decodes a digital signal $S_{D1}$ to generate control signals $S_{C1}$ and $S_{C2}$ as well as switch signals $S_{S1}$ and $S_{S2}$. A digital to analog converter 30 is coupled to the decoder 28 and the voltage divider 18. The digital to analog converter (DAC) 30 includes switches SW1 and SW2 and variable current sources 32 and 34. The switch SW1 is coupled between the variable current source 32 and the voltage divider 18. The switch SW2 is coupled between the voltage divider 18 and the variable current source 34. The variable current source 32 adjusts the amount of the current I1 according to the control signal $S_{C1}$, and the variable current source 34 adjusts the amount of the current I2 according to the control signal $S_{C2}$. The switches SW1 and SW2 will be turned on or turned off according to the switch signals $S_{S1}$ and $S_{S2}$. When the switch signal $S_{S1}$ turns on the switch SW1, the variable current source 32 injects the current I1 into the resistor R2 in the voltage divider 18. When the switch signal $S_{S2}$ turns on the switch SW2, the variable current source 34 sinks the current I2 from the resistor R2 in the voltage divider 18.

The control circuit 16 shown in FIG. 4 further includes a microcontroller 26 that includes a program memory 46 and a data memory 48 for saving information. The microcontroller 26 generates the digital signals $S_{D1}$ and $S_{D2}$ according to the saved information to the decoder 28 and a digital to analog converter 36, respectively. According to the digital signal $S_{D2}$, the digital to analog converter 36 generates a reference voltage Vref at an output terminal 38 and generates an overvoltage threshold Vref_ov at an output terminal 40. An error amplifier 42 has a positive input terminal coupled to the voltage divider 18 and the digital to analog converter 30, a negative input terminal coupled to the output terminal 38 of the digital to analog converter 36, and an output terminal connected to a control terminal 50 of a transistor Q8. The transistor Q8 is coupled between the optical coupler 6 and a ground terminal. The error amplifier 42 controls the current Is flowing through the transistor Q8 according to a difference between the voltage signal $V_{DIV}$ and the reference voltage Vref. The optical coupler 6 generates the feedback signal Ifb according to the current Is. A shunt regulator 4 in FIG. 5 is formed by the transistor Q8 and the error amplifier 42. In this embodiment, a comparator 44 is utilized for achieving an overvoltage protection, in which a positive input terminal of the comparator 44 is coupled to the voltage divider 18, and a negative input terminal of the comparator 44 is coupled to the output terminal 40 of the digital to analog converter 36. When the voltage signal $V_{DIV}$ is higher than the overvoltage threshold Vref_ov, the comparator 44 generates a protecting signal Sov to turn off the power converter 2 so as to achieve the overvoltage protection. In other embodiments, the comparator 44 can be also utilized for achieving an under voltage protection. In such circumstances, the digital to analog converter 36 will provide an under voltage threshold supplied to the positive terminal of the comparator 44, and the negative input terminal of the comparator 44 will receive the voltage signal $V_{DIV}$. When the voltage signal $V_{DIV}$ is lower than the under voltage threshold, the comparator 44 will generate a protecting signal to turn off the power converter 2, thereby achieving the under voltage protection.

In FIG. 4, when the offset current generator 20 neither injects the current I1 nor sinks the current I2, the output voltage is $$V_{OUT}=Vref \times (R1+R2)/R2. \quad (EQ-1)$$

When the offset current generator 20 injects the current I1 into the voltage divider, the output voltage is $$V_{OUT}=Vref \times (R1+R2)/R2 - I1 \times R1. \quad (EQ-2)$$

When the offset current generator 20 sinks the current I2f from the voltage divider, the output voltage is $$V_{OUT}=Vref \times (R1+R2)/R2 + I2 \times R1. \quad (EQ-3)$$

As illustrated by the equations EQ-2 and EQ-3, the offset current generator 20 can adjust the output voltage $V_{OUT}$ by adjusting the current I1 or I2. The adjustable steps of the output voltage $V_{OUT}$ can be increased as long as the decoder 28 with a higher resolution (i.e. bit numbers) and the digital to analog converter 30 with a higher resolution are selected. No extra components (resistors or switches) are needed. Moreover, as shown in FIG. 5, the offset current generator 20, the microcontroller 26, and the digital to analog converter 36 can be integrated in an IC in order to simplify the circuitry of the power converter 2. The resolutions of the digital to analog converters 30 and 36 can be determined according to requirements. The resolution of the digital to analog converter 30 can be lower than that of the digital to analog converter 36.

Figure 6:
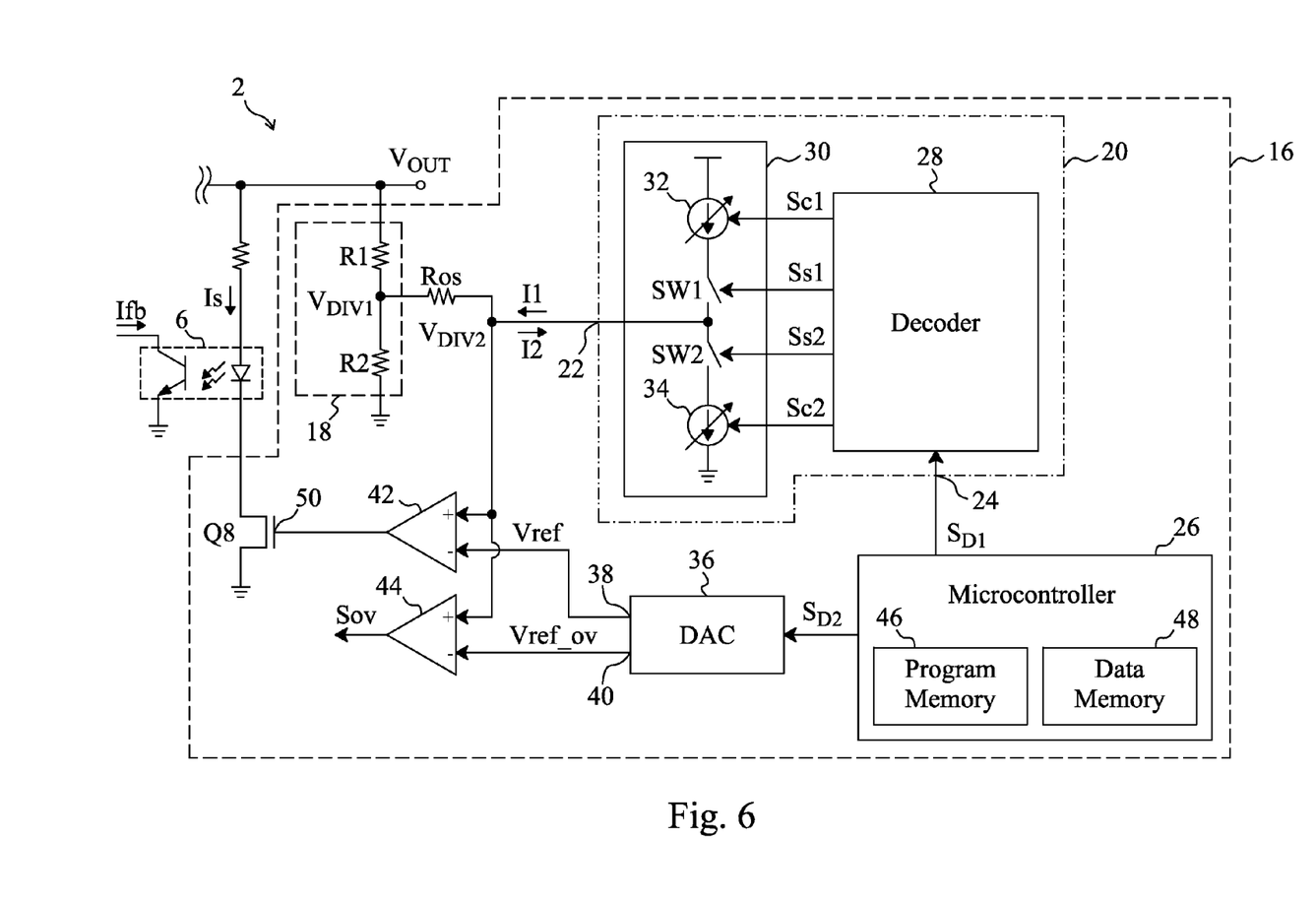
FIG. 6 shows a second embodiment of the present invention.
Figure 7:
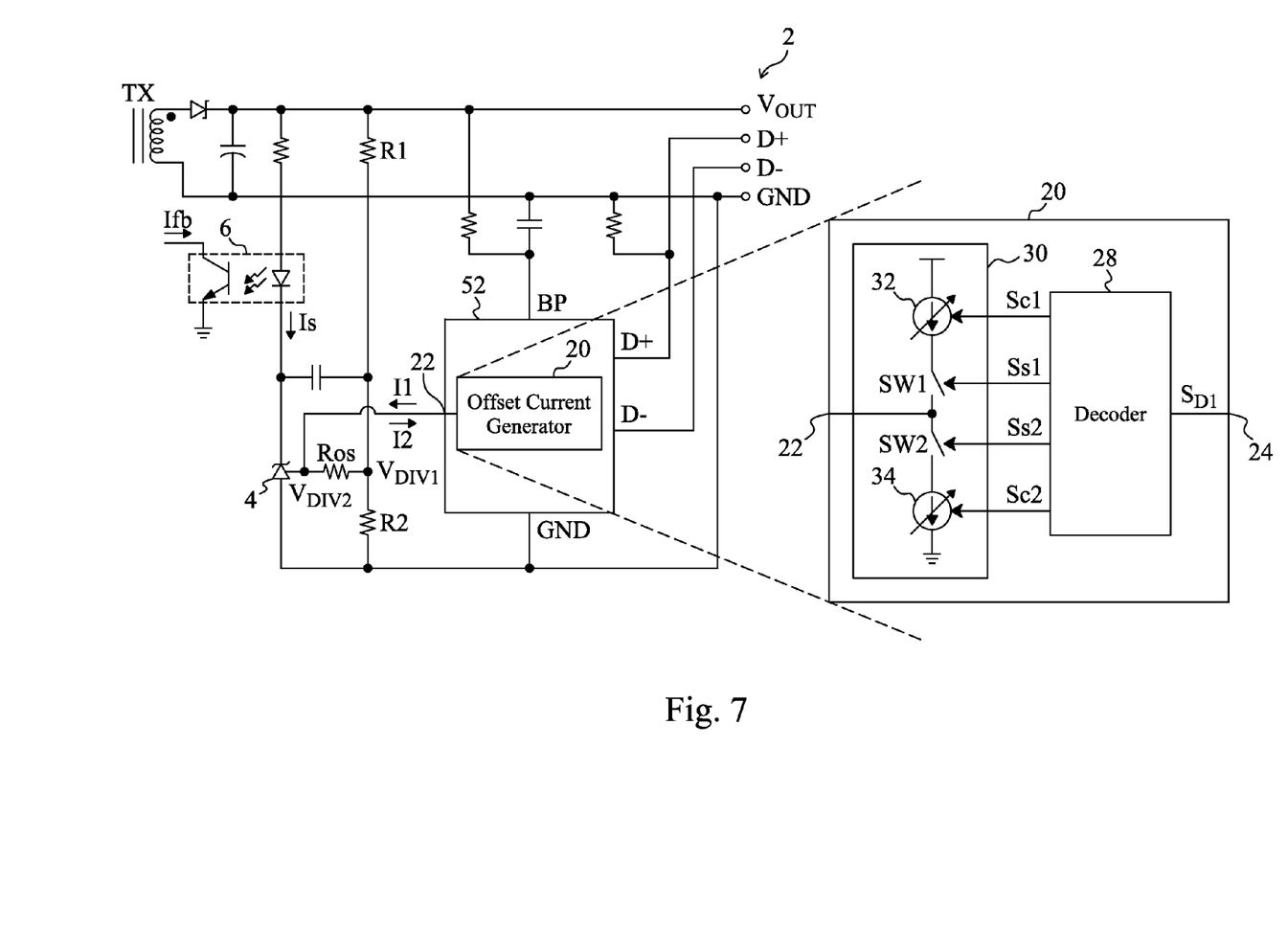
FIG. 7 shows a simplified circuitry of FIG. 6.

FIG. 6 shows a second embodiment of the present invention, and FIG. 7 shows a simplified circuitry of FIG. 6. In FIGS. 6 and 7, the optical coupler 6 serves as a feedback loop for providing the feedback signal Ifb related to the output voltage $V_{OUT}$ for regulating the output voltage $V_{OUT}$. The control circuit 16 is coupled to the optical coupler 6 for controlling the feedback signal Ifb and adjusting the output voltage $V_{OUT}$. Alternatively, the optical coupler 6 can be replaced by other suitable feedback loop. The control circuit 16 in FIG. 6 has the same offset current generator 20, microcontroller 26, and digital to analog converter 36 as those in FIG. 4. In the control circuit 16 of FIG. 6, the voltage divider 18 formed by the series resistors R1 and R2 divides the output voltage $V_{OUT}$ to generate the voltage signal $V_{DIV1}$. A first terminal of the offset resistor Ros is coupled to the voltage divider 18, and a second terminal of the offset resistor Ros is coupled to the terminal 22 of the offset current generator 20. When the switch signal $S_{S1}$ turns on the switch SW1 that is coupled between the variable current source 32 and the second terminal of the offset resistor Ros in the offset current generator 20, the variable current source 32 thence injects the current I1 to the offset resistor Ros. When the switch signal $S_{S2}$ turns on the switch SW2 coupled between the second terminal of the offset resistor Ros and the variable current source 34 in the offset current generator 20, the variable current source 34 sinks current I2 from the offset resistor Ros. The offset resistor Ros generates an offset voltage in accordance with the current I1 or I2, thereby offsetting the voltage signal $V_{DIV1}$ so as to generate the voltage signal $V_{DIV2}$ at the second terminal of the offset resistor Ros.

An error amplifier 42 of the control circuit 16 in FIG. 6 has the positive input terminal coupled to the offset resistor Ros and the digital to analog converter 30, the negative input terminal coupled to the output terminal 38 of the digital to analog converter 36, and the output terminal coupled to the control terminal 50 of the transistor Q8. The transistor Q8 is coupled between the optical coupler 6 and the ground terminal. The error amplifier 40 controls the current Is that is passing through the transistor Q8 according to the difference between the voltage signal $V_{DIV2}$ and the reference voltage Vref. The optical coupler 6 generates the feedback signal Ifb according to the current Is. The variable current sources 32 and 34 of the offset current generator 20 respectively control the amounts of the currents I1 and I2 according to the control signals Sc1 and Sc2, thereby controlling the voltage signal $V_{DIV2}$ so as to adjust the feedback signal Ifb to adjust the output voltage $V_{OUT}$. In the control circuit 16 in FIG. 6, the positive terminal of the comparator 44 is coupled to the offset resistor Ros, the negative terminal thereof is coupled to the output terminal 40 of the digital to analog converter 36. The comparator 44 generates the protecting signal Sov when the voltage signal $V_{DIV2}$ is higher than the overvoltage threshold Vref_ov for turning off the power converter 2 so as to achieve the overvoltage protection. In other embodiments, the comparator 44 can be applied to the under voltage protection. In such circumstances, the positive terminal of the comparator receives the under voltage threshold provided by the digital to analog converter 36, and the negative terminal of the comparator receives the voltage signal $V_{DIV2}$. When the voltage signal $V_{DIV2}$ is lower than the under voltage threshold, a protecting signal will be generated, thereby turning off the power converter 2 to achieve the under voltage protection.

In FIG. 6, supposed that the resistance value of the offset resistor Ros is much higher than the resistors R1 and R2, when the current I1 is injected to the offset resistor Ros, the output voltage is $$V_{OUT}=(Vref-I1\times Ros)\times(R1+R2)/R2. \quad (EQ\text{-}4)$$

When the current I2 is sunken from the offset resistor Ros, the output voltage is $$V_{OUT}=(Vref+I2\times Ros)\times(R1+R2)/R2. \quad (EQ\text{-}5)$$

As illustrated by the equations EQ-4 and EQ-5, the control circuit 16 in FIG. 6 is able to adjust the output voltage $V_{OUT}$ via adjusting the currents I1 or I2. The adjustable steps of the output voltage $V_{OUT}$ can be increased as long as the decoder 28 with a higher resolution (i.e. bit numbers) and the digital to analog converter 30 with a higher resolution are selected. No extra components (resistors or switches) are needed. Moreover, as shown in FIG. 7, the offset current generator 20, the microcontroller 26, and the digital to analog converter 36 can be integrated in the IC 52 in order to simplify the circuitry of the power converter 2. The resolutions of the digital to analog converters 30 and 36 can be determined according to requirements. The resolution of the digital to analog converter 30 can be lower than that of the digital to analog converter 36.

Figure 8:
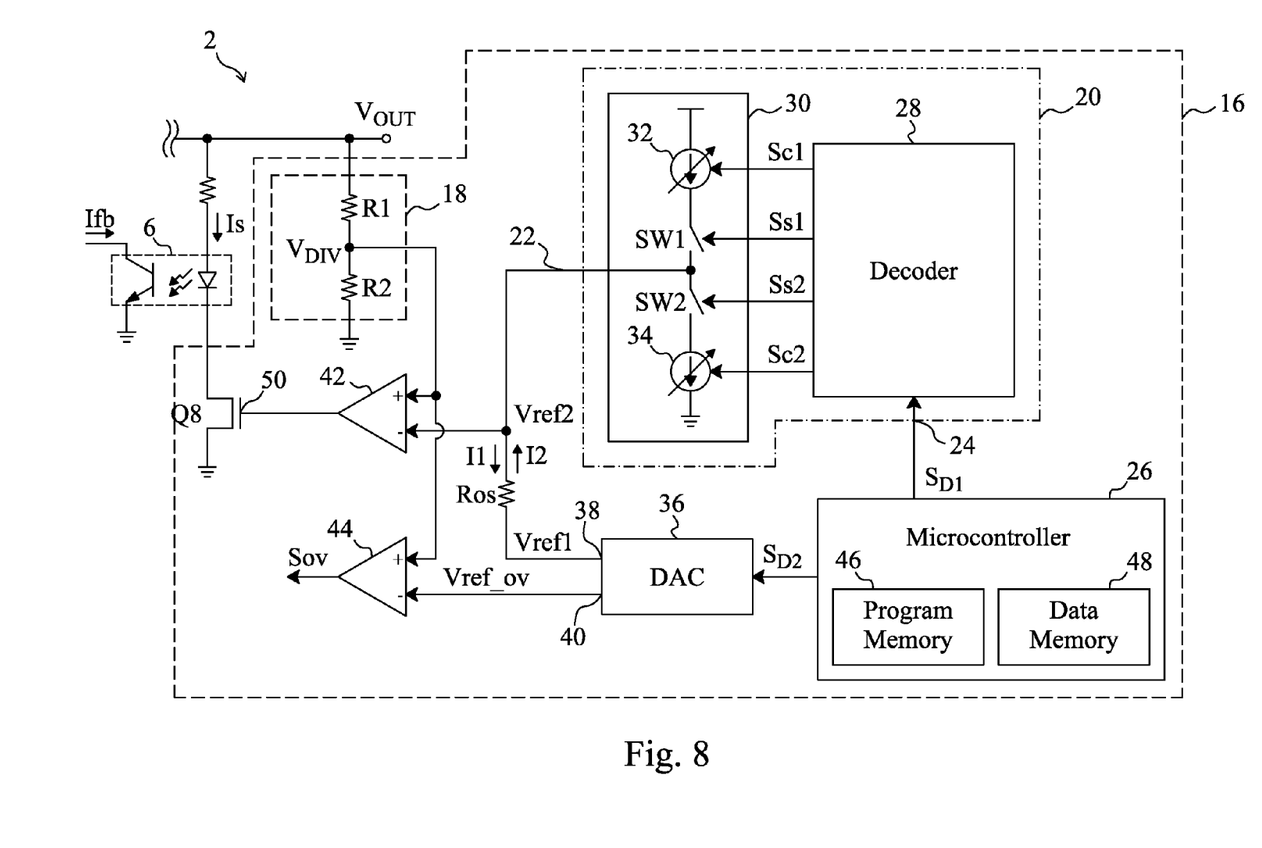
FIG. 8 shows a third embodiment of the present invention.

FIG. 8 shows a third embodiment of the present invention, which comprises the same voltage divider 18, offset current generator 20, microcontroller 26, and digital to analog converter 36 as those in FIG. 4. In the circuitry of FIG. 8, the optical coupler 6 serving as the feedback loop is also set at the secondary side of the transformer TX (not shown in FIG. 8) of the power converter 2 for providing the feedback signal Ifb related to the output voltage $V_{OUT}$ so as to regulating the output voltage $V_{OUT}$ at a target level. In this embodiment, the voltage divider 18 divides the output voltage $V_{OUT}$ to generate the voltage signal $V_{DIV}$ related to the output voltage, the output terminal 38 of the digital to analog converter 36 provides the reference voltage Vref1, the first terminal of the offset resistor Ros is coupled to the output terminal 38 of the digital to analog converter 36 for receiving the reference voltage Vref1, the second terminal of the offset resistor Ros is coupled to the terminal 22 of the offset current generator 20 and outputs the reference voltage Vref2 for determining the target level of the output voltage $V_{OUT}$, the offset current generator 20 injects the current I1 to the offset resistor Ros or sinks the current I2 from the offset resistor Ros, and the error amplifier 42 has a positive input terminal coupled to the voltage divider 18, a negative input terminal coupled to the digital to analog converter 30 and the offset resistor Ros, and an output terminal coupled to the control terminal 50 of the transistor Q8 that is coupled between the optical coupler 6 and a ground terminal. The error amplifier 42 controls the current Is flowing through the transistor Q8 according to a difference between the voltage signal $V_{DIV}$ and the reference voltage Vref2. The optical coupler 6 determines the feedback signal Ifb according to the current Is. When the switch signal $S_{S1}$ turns on the switch SW1 of the offset current generator 20, the variable current source 32 determines the current I1 that is injected into the offset resistor Ros according to the control signal $S_{C1}$. When the switch signal $S_{S2}$ turns on the switch SW2 of the offset current generator 20, the variable current source 34 determines the current I2 that is sunken from the offset resistor Ros according to the control signal $S_{C2}$. Accordingly, the offset current generator 20 can change the offset voltage of the offset resistor Ros by adjusting the currents I1 and I2, thereby determining the reference voltage Vref2 to change the target level of the output voltage $V_{OUT}$. The conventional complicated circuitry for choosing the reference voltage Vref2 is not required. The adjustable steps of the output voltage $V_{OUT}$ can be increased as long as the decoder 28 with a higher resolution (i.e. bit numbers) and the digital to analog converter 30 with a higher resolution are selected. No extra components (resistors or switches) are needed. Moreover, the offset current generator 20, the microcontroller 26, and the digital to analog converter 36 can be integrated in the IC in order to simplify the circuitry of the power converter 2. The resolutions of the digital to analog converters 30 and 36 can be determined according to requirements. The resolution of the digital to analog converter 30 can be lower than that of the digital to analog converter 36.

The control circuit 16 in FIG. 8 also includes the comparator 44. The positive terminal of the comparator 44 is coupled to the voltage divider 18 for receiving the voltage signal $V_{DIV}$. The negative terminal the comparator 44 is coupled to the output terminal 40 of the digital to analog converter 36. The comparator 44 generates the protecting signal Sov when the voltage signal $V_{DIV}$ is higher than the overvoltage threshold Vref_ov provided by the digital to analog converter 36, thereby turning off the power converter 2 to achieve the overvoltage protection. In other embodiments, the comparator 44 can be applied for an under voltage protection. In such circumstances, the positive terminal of the comparator 44 receives the under voltage threshold provided by the digital to analog converter 36, and the negative terminal thereof receives the voltage signal $V_{DIV}$. When the voltage signal $V_{DIV}$ is lower than the under voltage threshold, the protecting signal will be generated, thereby turning off the power converter 2 to achieve the under voltage protection.

Figure 9:
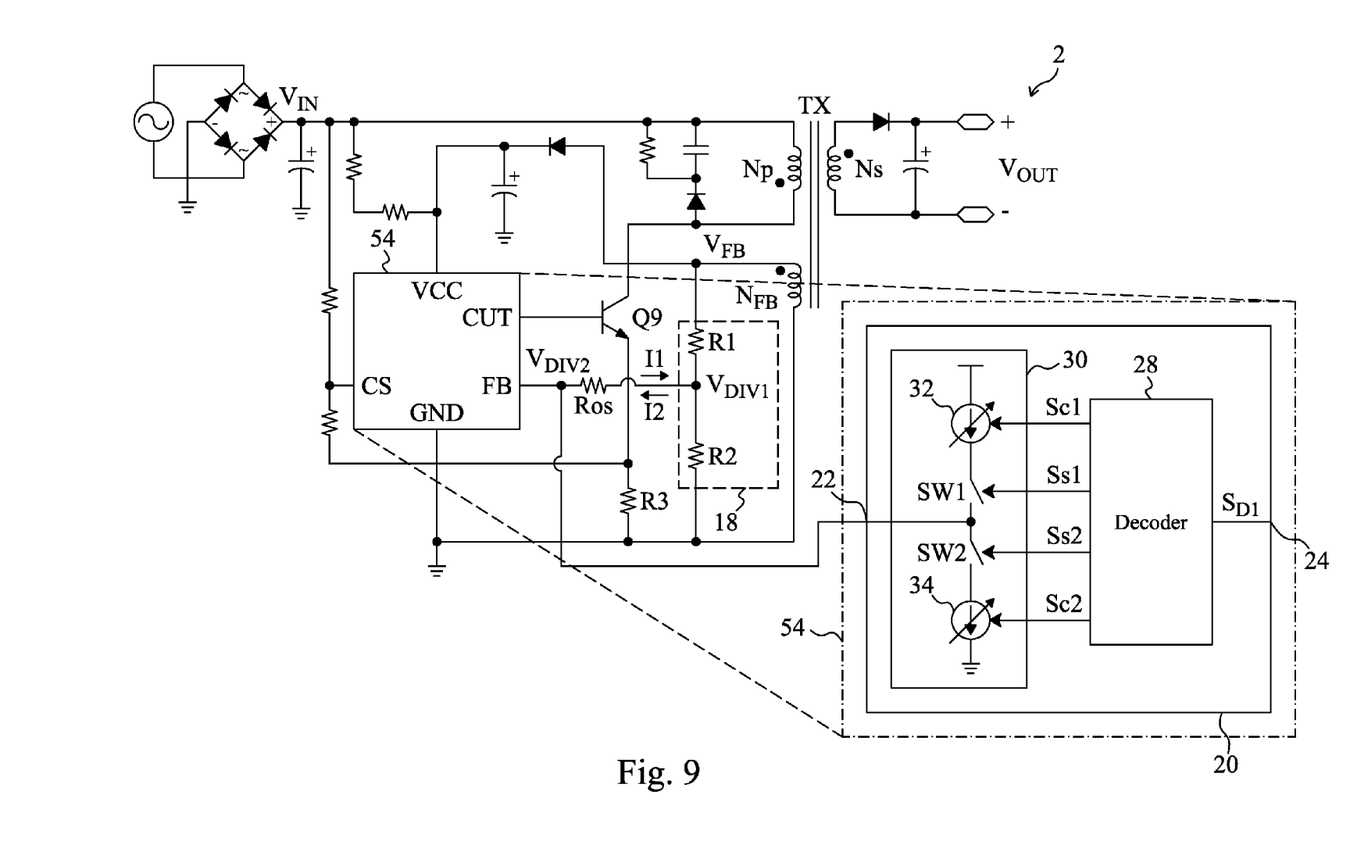
FIG. 9 shows a fourth embodiment of the present invention.

The offset current generator 20 in FIGS. 4 to 8 is configured at the secondary side of the transformer TX of the power converter 2. However, the offset current generator 20 can be configured at the primary side of the transformer TX, as illustrated in a fourth embodiment of the present invention as shown in FIG. 9. The power converter 2 includes a transformer TX converting an input voltage $V_{IN}$ into the output voltage $V_{OUT}$ by a primary side coil Np and a secondary side coil Ns. An auxiliary coil $N_{FB}$ of the transformer TX is installed at the primary side of the transformer TX for detecting the output voltage $V_{OUT}$ to generate the voltage signal $V_{FB}$. The serially-connected resistors R1 and R2 form the voltage divider 18 coupled to the auxiliary coil $N_{FB}$ for dividing the voltage signal $V_{FB}$ to generate the voltage signal $V_{DIV1}$. In the embodiment of FIG. 9, the control circuit of the present invention includes the offset resistor Ros and the offset current generator 20. The first terminal of the offset resistor Ros is coupled to the voltage divider 18 for receiving the voltage signal $V_{DIV1}$. The second terminal of the offset Ros is coupled to a feedback terminal FB of the control IC 54 and provides the voltage signal $V_{DIV2}$. The control IC 54 controls the switching of the transistor Q9 according to the voltage signal $V_{DIV2}$, thereby regulating the output voltage $V_{OUT}$. The offset current generator 20 is integrated in the IC so as to simplify the circuitry of the power converter 2. The offset current generator 20 is coupled to the offset resistor Ros via the terminal 22 and receives the digital signal $S_{D1}$ via the terminal 24. The digital signal $S_{D1}$ is provided by the microcontroller 26 as shown in FIG. 4. In the offset current generator 20, the decoder 28 decodes the digital signals $S_{D1}$ to generate control signals $S_{C1}$ and $S_{C2}$ as well as switch signals $S_{S1}$ and $S_{S2}$. The digital to analog converter 30 of the offset current generator 20 includes variable current sources 32 and 34 and switches SW1 and SW2. The switch SW1 is coupled between the variable current source 32 and the second terminal of the offset resistor Ros. The switch SW2 is coupled between the second terminal of the offset resistor Ros and the variable current source 34. The variable current source 32 adjusts the current I1 that is injected into the offset resistor Ros according to the control signal $S_{C1}$ when the switch signal $S_{S1}$ turns on the switch SW1 of the offset current generator 20. The variable current source 34 adjusts the current I2 that is sunken from the offset resistor Ros according to the control signal $S_{C2}$ when the switch signal $S_{S2}$ turns on the switch SW2 of the offset current generator 20. The offset current generator 20 changes the offset voltage of the offset resistor Ros by adjusting the currents I1 and I2, thereby adjusting the voltage signal $V_{DIV2}$ so as to the output voltage $V_{OUT}$. The adjustable steps of the output voltage $V_{OUT}$ can be increased as long as the decoder 28 with a higher resolution (i.e. bit numbers) and the digital to analog converter 30 with a higher resolution are selected. No extra components (resistors or switches) are needed.

In contrast with the conventional method for changing the divider ratio by changing the resistances and choosing the reference voltage, control circuits and methods according to the present invention, which control the current I1 or I2 to adjust the output voltage $V_{OUT}$, are simpler. Moreover, the adjustable steps can be easily increased. The present invention can be applied to not only the AC to DC power converters but also the DC to DC power converters, or other type of power converters.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for programming an output voltage of a power converter including a feedback loop configured to operably provide a feedback signal related to the output voltage so as to regulate the output voltage, the control circuit comprising:
   a voltage divider configured to operably divide the output voltage to generate a voltage signal for controlling the feedback signal; and
   an offset current generator coupled to the voltage divider and configured to operably inject a first current to the voltage divider or sink a second current from the voltage divider to adjust the voltage signal so as to adjust the output voltage;
   wherein the offset current generator includes:
   a decoder configured to operably decode a first digital signal; and
   a first digital to analog converter coupled to the decoder and the voltage divider and configured to operably inject the first current to the voltage divider or sink the second current from the voltage divider according to outputs of the decoder.

2. The control circuit of claim 1, wherein the voltage divider comprises a pair of resistors that are in a serial connection configured to operably divide the output voltage to generate the voltage signal.

3. The control circuit of claim 1, wherein the outputs of the decoder comprises a first control signal, a second control signal, a first switch signal, and a second switch signal.

4. The control circuit of claim 3, wherein the first digital to analog converter comprises:
   a first variable current source configured to operably adjust the first current according to the first control signal;
   a first switch coupled between the first variable current source and the voltage divider; wherein, the first switch will be turned on or turned off according to the first switch signal;
   a second variable current source configured to operably adjust the second current according to the second control signal; and
   a second switch coupled between the second variable current source and the divider; wherein, the second switch will be turned on or turned off according to the second switch signal.

5. The control circuit of claim 1, further comprising:
   a transistor coupled to the feedback loop; wherein, a current that is passing through the transistor determines the feedback signal;
   a second digital to analog converter having a first output terminal for providing a reference voltage; and
   an error amplifier having a first input terminal coupled to the voltage divider and the first digital to analog converter, a second input terminal coupled to the second digital to analog converter, and an output terminal coupled to a control terminal of the transistor; the error amplifier configured to operably control the current that is passing through the transistor according to a difference between the voltage signal and the reference voltage.

6. The control circuit of claim 5, wherein a resolution of the first digital to analog converter is lower than a resolution of the second digital to analog converter.

7. The control circuit of claim 5, further comprising a microcontroller coupled to the second digital to analog converter and the decoder.

8. The control circuit of claim 7, wherein the microcontroller comprises a program memory and a data memory and is configured to operably generate a first digital signal to the decoder and a second digital signal to the second digital to analog converter to determine the reference voltage according to information saved in the program memory and the data memory.

9. The control circuit of claim 5, wherein the second digital to analog converter comprises a second output terminal to provide a threshold.

10. The control circuit of claim 9, further comprising a comparator, coupled to the voltage divider and the second output terminal of the second digital to analog converter, configured to operably compare the voltage signal with the threshold and generate a protecting signal to turn off the power converter so as to achieve an overvoltage protection when the voltage signal is higher than the threshold.

11. The control circuit of claim 9, further comprising a comparator, coupled to the voltage divider and the second output terminal of the second digital to analog converter, configured to operably compare the voltage signal with the threshold and generate a protecting signal to turn off the power converter so as to achieve an under voltage protection when the voltage signal is lower than the threshold.

12. A control method for programming an output voltage of a power converter including a feedback loop configured to operably provide a feedback signal related to the output voltage so as to regulate the output voltage, the control method comprising the steps of:

generating a voltage signal by a voltage divider dividing the output voltage so as to control the feedback signal; and injecting a first current to the voltage divider or sinking a second current from the voltage divider so as to change the voltage signal;

wherein the step of injecting a first current to the voltage divider or sinking a second current from the voltage divider so as to change the voltage signal includes:

decoding a digital signal to generate a decoded result; and injecting the first current to the voltage divider or sinking the second current from the voltage divider according to the decoded result.

13. The method of claim 12, further comprising a step of controlling the feedback signal according to a difference of the voltage signal and a reference voltage.

14. The method of claim 12, further comprising a step of generating a protecting signal when the voltage signal is higher than a threshold to turn off the power converter so as to achieve an overvoltage protection.

15. The method of claim 12, further comprising a step of generating a protecting signal when the voltage signal is lower than a threshold to turn off the power converter so as to achieve an under voltage protection.

* * * * *